June 14, 1938.  E. BILLINGS ET AL  2,120,541
MANUFACTURE OF CARBON BLACK
Filed Nov. 16, 1932  2 Sheets-Sheet 2

Inventor
Edmund Billings and
Harold H. Offutt
by Henry & Witter
Attorneys

Patented June 14, 1938

2,120,541

UNITED STATES PATENT OFFICE 2,120,541

MANUFACTURE OF CARBON BLACK

Edmund Billings, Weston, and Harold H. Offutt, Winchester, Mass., assignors to Godfrey L. Cabot, Inc., Boston, Mass., a corporation of Massachusetts Application November 16, 1932, Serial No. 642,850

29 Claims. (Cl. 134—60)

This invention relates to improvements in the manufacture of carbon black. In one aspect it consists in improvements in the process disclosed in our copending application Serial No. 623,184, filed July 18, 1932, for manufacturing carbon black in the form of granules of relatively high apparent density. The present application is a continuation in part of that application as to all common subject matter.

This invention, as well as that of our said copending application, rests upon the discovery that by subjecting carbon black particles in a dry state to multi-directional pressure, at the same time maintaining them in a state of turbulence, they are caused to agglomerate with each other and to associate together in a novel form, viz., the particles are built up systematically and progressively into spherical granules, relatively tenacious in structure, relatively non-coherent and non-adherent of surface and of an apparent density of more than 18 pounds per cubic foot. The novel product thus produced possesses striking commercial advantages. In the first place, it is substantially dustless in that nearly all of its particles are agglomerated into granules of substantial size and density. In the second place, the density and the non-adherent character of the surface of the granules reduces the apparent viscosity of the mass and permits the carbon black to be conveyed through pipes by gravity or by streams of air, to be transported in tank cars and to be stored in bulk. Beside being much more cleanly for the consumer to handle, the novel product when properly mixed with ingredients such as rubber disperses as completely and perfectly as commercial carbon black of forms heretofore known.

The novel product above described is the subject matter of U. S. Letters Patent No. 1,957,314, granted May 1, 1934 upon our copending application. The process herein disclosed comprises one of several whereby that product may be manufactured economically on a commercial basis.

The precise steps leading to the production of this new product of manufacture may be varied to some extent so long as each nucleus or center is subjected to impact or pressure from substantially every direction. One manner of securing satisfactory conditions is to maintain the carbon black for a sufficient time in a state approaching perfect turbulence under conditions of turbulent pressure such that each particle has freedom of motion and is associated with other particles in sufficient number to insure the multi-directional pressures or impacts required. For example, a charge of commercial carbon black may be converted into the form of relatively hard, dense and spherical grains by being properly agitated in a drum so that the requisite pressures result from the impact of the agitating blades, the impact of one particle against another and the impact of the particles against the walls of the drum.

Another manner in which the desired results may be secured is by treating a charge of commercial carbon black in a mill of the character of a ball mill. In this case, the requisite pressures may be derived principally from the rolling impact of the particles as they drop from particle to particle in rolling down the surface of the shifting mass in the mill or from the impact of particles against the rotating walls.

In whatever apparatus the carbon black is treated, the process of conversion to the dense granular form is expedited by including in the mass a quantity of carbon black in its final form, that is to say, a mother or priming charge in said granular form. The explanation of this probably is that an increased number of pressure and impact supplying units is thereby provided and the requisite degree of turbulence facilitated so that the agglomeration, shaping and compacting of the individual dense spherical grains takes place more rapidly than under conditions wherein the building up of the carbon black granules is brought about in an amorphous mass. The introduction into the process of this seeding or priming step is advantageous principally because it reduces the time required for effecting a complete agglomeration or conversion of the charge but it is not otherwise essential.

Commercial carbon black in bulk is very viscous and for this reason offers considerable resistance to the turbulent motion above described, especially when treated in relatively large bulk. We have discovered that the speed of the process is somewhat enhanced by intensifying the impact nature of this turbulence and that such improvement may be effectively brought about by subjecting the carbon black to turbulent pressure between opposing surfaces relatively movable toward and past each other to agitate and impact the black therebetween in a turbulent manner. This action brings the particles comprising the black into a most intimate and bombarding relation, whereby they are more speedily and completely compacted into the relatively hard and dense form above described. The efficiency of the process and the consistency and value of the product also depend to a very large extent upon the uniformity of the treatment of all the parts of the carbon black during this operation and for this reason we also agitate or move the black transversely of and simultaneously with the turbulent movement imparted as above explained. This latter agitation serves to circulate the bulk of black continuously during the treatment and thereby tends to keep the product uniform at all times. We also prefer to oppose somewhat this latter agitation, whereby such movement serves not only to keep the product uniform but also aids in the impacting of the black into its final dense form. Thus the black is agitated in two directions at an angle to each other and, while being kept of a uniform consistency, is impacted into dense form by the opposition to its movement in said directions and the impacts and encounters.

The nature of the invention will be best understood and appreciated from the following description of one form of apparatus which is well adapted for the production of spherical grain carbon black in accordance with our improved process. In the accompanying drawings, Fig. 1 is a vertical sectional view through an apparatus embodying our invention;

Figure 1:
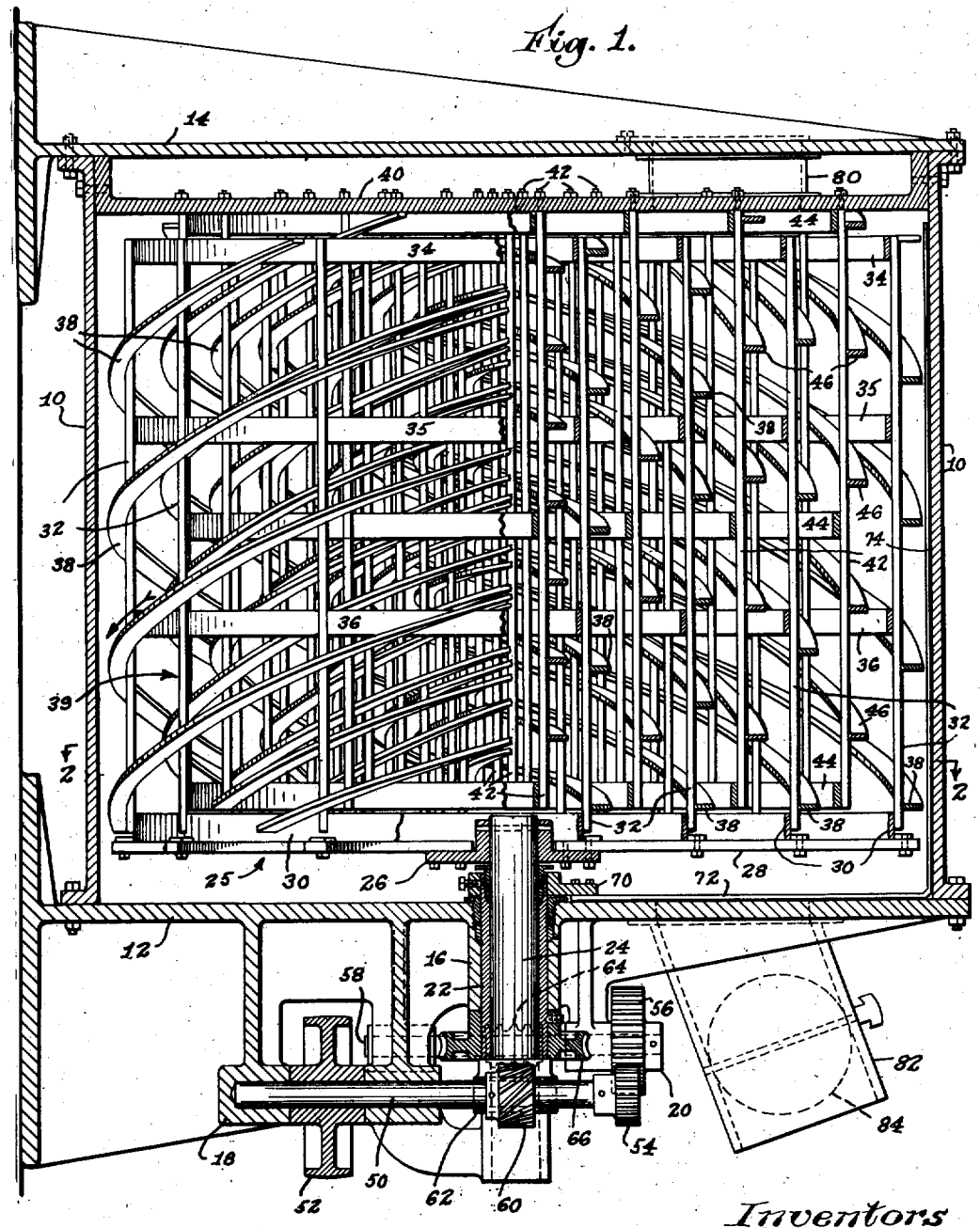
Figure 2:
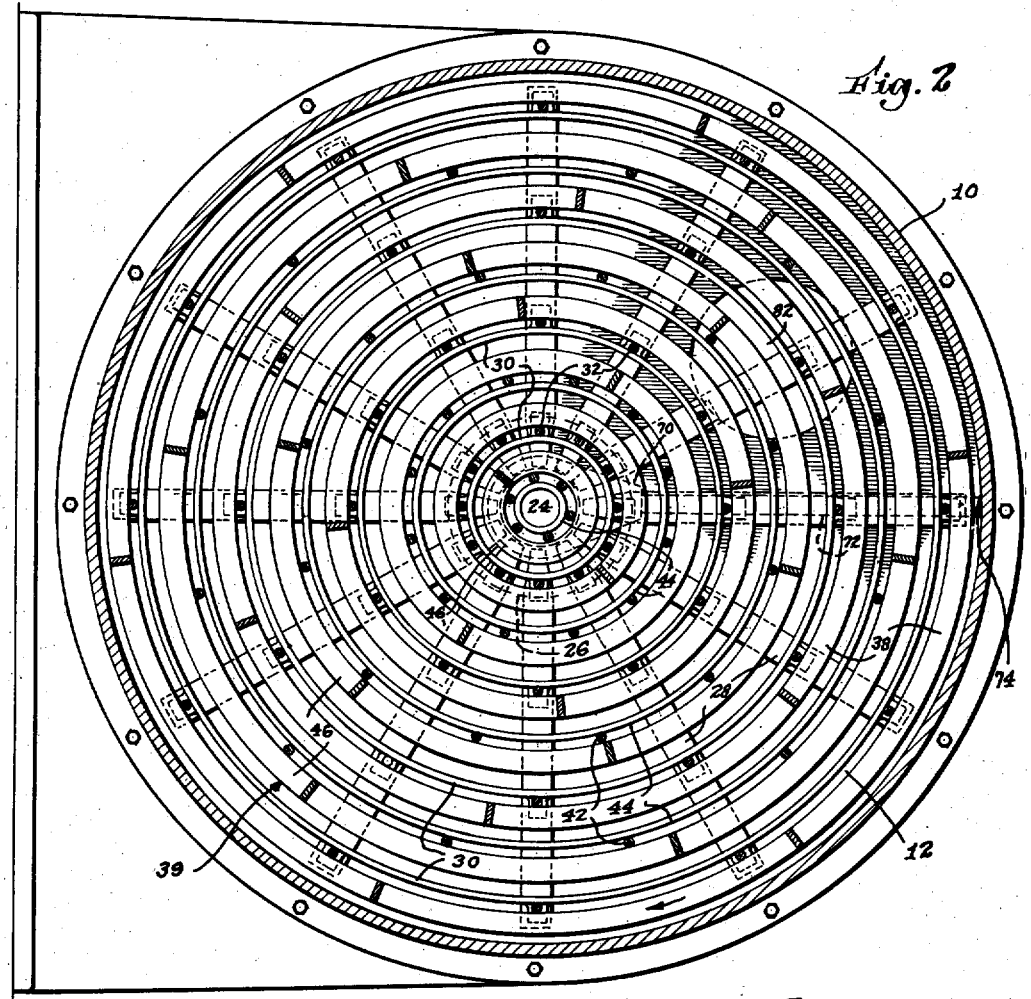
Fig. 2 is a plan view partly in section on line 2—2 of Fig. 1.

The apparatus comprises a stationary vertically-disposed tank or drum 10 which is formed from a cylindrical shell flanged and bolted to bottom and top plates 12 and 14. Depending from the bottom plate is a boss providing a vertical bearing 16 and brackets providing horizontal bearings 18 and 20. Rotatably mounted in the vertical bearing 16 are a sleeve 22 and a shaft 24, the sleeve and shaft extending upwardly into the drum 10.

Mounted on the upper end of the shaft 24 and within the drum 10 is a rotatable cage 25 supported on a flanged collar 26 pinned to the shaft. This cage comprises a plurality of radially-extending bottom bars 28 supporting thereon four concentric bands 30 disposed edgewise in spaced relation. Carried by each band 30 and extending vertically upward therefrom are a plurality of impelling elements in the nature of rods 32 circular in cross section. The top ends and the intermediate portions of the rods are connected together by similar concentric bands 34, 35 and 36. Also carried by each circular row of rods 32 are one or more spirally arranged straps or blades 38.

An inverted cage 39, similar to the cage 25 supported on the collar 26 and just described, is mounted in stationary position on a plate 40 secured within the upper end of the drum 10. This stationary cage 39 comprises a plurality of circular rows of rods 42, corresponding to the rows of rods 32 and spaced concentrically, carried by and depending from the plate 40. The rods 42 in each row are connected together by three or more bands 44 and each row of rods also has mounted thereon one or more spirally-arranged straps or blades 46, the stationary straps 46 being pitched in the same direction as and arranged in a manner similar to the movable straps 38.

A relative rotary movement is provided between the two cages by rotating the shaft 24 on which is mounted the cage 25. A shaft 50, having a driving pulley 52 thereon, is mounted in the bearings 18 beneath the drum 10 and on the opposite end of this shaft is a gear 54 arranged in mesh with a relatively larger gear 56 on a parallel shaft 58 journaled in the bearings 20. A spiral gear 60 on the shaft 50 is arranged to mesh with a like gear 62 on the vertical shaft 24 and a worm 64 on the shaft 58 is in mesh with a worm gear 66 on the lower end of the sleeve 22. Through these connections the pulley 52 is connected to rotate the first described cage 25 in a counter-clockwise direction as shown by the arrow (Fig. 1) and to rotate the sleeve 22 in the same direction at a relatively slower speed.

The sleeve 16 is provided with a flange 70 to which is secured a scraper having a horizontal portion 72 extending radially outward along the bottom wall of the drum and a vertical portion 74 extending upwardly along the side wall of the drum, a substantial clearance being provided between both parts of the scraper and the drum walls. The scale of the drawings does not permit showing this clearance. The principal function of the scraper is to remove from the bottom and side walls of the drum the carbon black which would otherwise build up thereon in the form of a coating or shell and which would otherwise become thick enough to extend within the path of movement of the straps 38 and seriously vary the clearance between the side walls and the elements 32. It will be understood that to permit the product to build up on these walls would not only deleteriously affect the desired turbulent motion of the product, reduce the effective capacity of the apparatus and increase the power consumption unnecessarily, but would produce a shearing and breaking up of the treated product and thus to some extent defeat the purpose of the treatment. The sleeve rotates the scraper at a reduced speed which is sufficient to keep the walls free from any substantial accumulation of the black, and by this arrangement shearing of the grains by the rotary cage or the scraper is substantially eliminated and the total amount of shearing in the apparatus is limited to a minimum.

The charge of flocculent carbon black may be introduced into the drum through an opening provided through the top wall at 80 and the finished product may be drawn off through a discharge pipe 82 in the bottom plate 12, a damper valve 84 being provided within the discharge pipe.

In operating the apparatus herein disclosed, the drum 10 may be filled nearly to its capacity with commercial carbon black or, as already intimated, a mixture of commercial carbon black with a primary charge of spherical-grain carbon black. The shaft 50 is then driven to rotate the cage 25 in the direction of the arrow (Fig. 1), the scraper 72—74 rotating in the same direction at a greatly reduced speed. In an apparatus having a drum of 4-foot diameter, a cage speed of 45 R. P. M. and a scraper speed of 1½ R. P. M., have been found to be quite satisfactory. The result of this operation is that the charge of carbon black is stirred or churned into a state of turbulence in which the particles are subjected to multi-directional pressure by impact with other particles and by impact against the opposing and repelling surfaces and against the walls of the drum. Under these conditions there occurs an agglomeration of the particles resulting in a progressive and systematic building up of them into spherical granules having hammered or impact-formed surfaces which present the striking characteristics of high density and non-adherent, free-flowing contact with each other. In general, it may be stated that the apparent density of the carbon black may be brought to approximately 30 pounds per cubic foot. At this density the granules may be 250 mesh or larger in diameter.

Figures 3, 4:
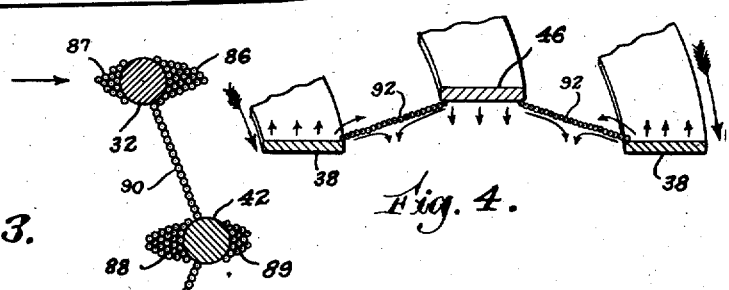
Fig. 3 is a fragmentary view on an enlarged scale illustrating diagrammatically the horizontal movement of the carbon black particles in the apparatus.
Fig. 4 is a fragmentary view in vertical section illustrating diagrammatically the vertical movement of the carbon black particles in the apparatus.

In the light of our present knowledge, we may suggest one theory of what takes place within the drum to cause the carbon black to assume its new and relatively dense form by reference to Figs. 3 and 4 of the drawings. The stationary elements 42 are arranged alternately with the moving elements 32 and the charge of carbon black surrounds and entirely fills the space between these elements. As the elements 32 move relative to the elements 42 (Fig. 3), they tend to carry the black in a mass therewith but such movement of the black is opposed by the stationary elements 42. The result is that cones 86 and 87 of carbon black form both forwardly and rearwardly of the elements 32 and move along with these elements, while cones 88 and 89 of carbon black form both forwardly and rearwardly of the elements 42 remain stationary therewith. The carbon black intermediate the elements 32 and 42 (indicated by line 90 of particles in Fig. 3) is in a state of turbulence, the black adjacent to the elements 32 moving nearly as fast as those elements and the carbon black adjacent to the elements 42 remaining nearly stationary. The relative positions of the elements are constantly changing as the elements 32 approach and recede from the elements 42 and, due to this action, the particles of carbon black are alternately being brought into most intimate and bombarding relation with each other whereby they are compacted into the relatively dense form of the finished product and into a relatively loose relation, wherein they are free to rearrange themselves for the next impact. Thus the carbon black particles are intermittently subjected to multi-directional pressures or impacts and are relatively rearranged between the successive impacts, such impacts or pressures thereby not occurring twice in succession in the same direction.

Simultaneously with the above action, the spiral straps 38 are acting constantly to move portions of the carbon black mass upwardly and thereby keep the product uniform from bottom to top. It will be understood that since the pressure of the carbon black increases with its depth, the nature of its turbulent and bombarding action will correspondingly vary from top to bottom. By constantly moving the black from bottom to top, the entire charge is being continuously passed through the apparatus and thereby given a uniform treatment throughout. This upward movement of the carbon black by the stationary spiral straps 38 is, however, opposed by the spiral straps 46 which are secured to the elements 42. The result of this arrangement is somewhat illustrated in Fig. 4. Rotation of the spirals 38 tend to raise the carbon black upwardly, while centrifugal action may also somewhat move the black outwardly. That portion of the black located intermediate each two adjacent and concentric spirals 38 is intercepted by a spiral 46 which, in like manner, not only opposes such upward movement but tends to move the black downwardly, it being understood that in the apparatus illustrated, the mass of carbon black as a whole is also rotating in the drum though at a greatly reduced speed. When the shaft 24 and the cage 25 in this apparatus are rotating at 45 R. P. M., the mass of carbon black ordinarily rotates at about 4 R. P. M. Thus the spirals 38 and 46 not only serve to keep the product uniform from top to bottom but also set up an opposing motion of the carbon black in a substantially vertical direction, similar to the horizontal motion set up by the elements 32 and 42, which materially aids in developing the necessary pressure of impact of the black and its conversion into its final dense form. This movement and opposing action of the black are illustrated by the arrrows and the lines 92 of black particles in Fig. 4.

When the treatment of a charge of carbon black has been continued in this manner from 60 to 120 minutes, it will be found that practically the entire charge has been converted from its original flocculent condition to the granular form above defined, in which all the grains are substantially spherical in their general shape but in which they vary somewhat in size. This finished product may be withdrawn and used advantageously without further treatment. However, for convenience in operation we prefer to separate the granular carbon black thus formed into two lots of relatively coarse and fine grains, as by sifting it through mesh of suitable size. The proportion of carbon black in these portions depends upon the size of the mesh of the sifting screen used and we have operated very satisfactorily with a mesh which results in two substantially equal portions. The coarser portion may be withdrawn at this stage as finished product, while the fine portion may be used as a priming charge for the succeeding batch. The fine portion is, accordingly, returned to the chamber 80 and sufficient untreated carbon black added to form a new batch.

While we have referred to the treatment of each batch as requiring a period of from 60 to 120 minutes, this may be varied within certain limits. It should be noted, however, that if the coarse size grains are not separated in the manner above described, then the grains formed may exceed the stable dimensions and will thereupon be broken down into fragments of more or less irregular shape which are substantially free of dust.

It will be noted that the two skeleton cages 25 and 39 are disposed in telescopic relation and that their impelling or baffle elements 32 and 42 are alternately arranged in radially spaced relation. The distance between these cooperating elements appears to be of some importance in carrying out our process and we have found that a radial spacing or clearance of about one inch between adjacent elements 32 and 42 is quite satisfactory. The spiral straps 38 and 46 are arranged in a similar manner and may be located on the outer sides of their baffle elements for convenience in manufacturing the cages. The speed of relative rotation between the cages is also of importance in successfully carrying out the process and, as above stated, we have found that a relative rotation between 27 and 45 R. P. M. is very satisfactory.

In addition to the characteristics of relatively high density and non-coherent surface, the carbon black granules produced as above outlined are relatively tenacious in their structure. They cannot be crushed between the fingers by normal pressure, although they may be readily crushed against a hard surface or by rubbing which subjects them to shearing stress between the fingers.

While we have explained to some extent a theory of the formation of the dense spherical granules which it is the object of our invention to produce, it should be understood that the exact nature and cause of the results attained are not at present fully understood and that there are undoubtedly other important factors in the phenomenon which will become apparent upon further practice of the process herein disclosed.

It is believed, however, that never heretofore has flocculent carbon black been progressively built up in a dry state, without assistance of binders, solvents, liquids, tars or other additions, either temporarily or permanently present in such a manner as to transform flocculent carbon black into substantially dustless tenacious granules, the particles of which are united only by their own cohesive force with sufficient tenacity of structure to resist disintegration when transported in bulk.

Having thus described our invention, what we claim as new and desire to secure by Letters Patent is:

1. A process of compacting dry flocculent carbon black, which consists in turbulently agitating the carbon black in a dry state in a manner causing agglomeration of the particles into relatively tenacious, self-sustaining and dense grains of substantially spherical shape that can be transportable in bulk without disintegration, and then agitating the agglomerated grains thus formed until they are broken down into substantially dustless fragments of irregular shape, said fragments retaining substantially the same physical properties as the dense grains.

2. A process of producing carbon black in the form of granules of carbon black of sufficient density and cohesion to withstand handling in bulk without disintegration, which consists in impacting the particles of flocculent carbon black in a dry state between opposing surfaces relatively movable toward and past each other in a manner maintaining the particles in a state of pronounced turbulence and thus causing systematic and progressive agglomeration of the particles into tenacious granules of the character described.

3. A process of producing carbon black in the form of granules of carbon black of sufficient density and cohesion to withstand handling in bulk without disintegration, which consists in impacting the particles of flocculent carbon black in a dry state between opposing surfaces relatively movable toward and past each other in a manner maintaining the particles in a state of pronounced turbulence and thus causing a systematic and progressive building up of the particles into tenacious granules, and simultaneously moving the particles in a direction transversely to the relative movement of said surfaces, thereby keeping the product uniform throughout the mass.

4. A process of producing carbon black in the form of granules of carbon black of sufficient density and cohesion to withstand handling in bulk without disintegration, which consists in turbulently impacting particles of flocculent carbon black in a dry state by propelling surfaces moving in a circular direction and opposing such movement of the particles by other surfaces located out of the path of movement of the first-mentioned surfaces, thereby systematically and progressively building up the particles into granules of the character described.

5. A process of producing carbon black in the form of granules of carbon black of sufficient density and cohesion to withstand handling in bulk without disintegration, which consists in forcing groups of particles of flocculent carbon black to flow between baffles having a predetermined clearance, thereby maintaining the particles in a state of pronounced turbulence and thus subjecting certain particles to recurring impacts and systematically and progressively agglomerating them with others into non-adherent, tenacious granules of the character described.

6. A process of producing carbon black in the form of granules of carbon black of sufficient density and cohesion to withstand handling in bulk without disintegration, which consists in subjecting particles of dry flocculent carbon black in a mass to violent turbulence in which occur successive and rapid impacting impulses causing the systematic and progressive agglomeration of the particles into tenacious, non-adherent granules, alternated with relaxing impulses causing a rearrangement of the particles in the mass.

7. A process of producing carbon black in the form of granules of carbon black of sufficient density and cohesion to withstand handling in bulk without disintegration, which consists in causing particles of dry carbon black in a mass to flow in spaced concentric zones, and simultaneously subjecting the particles to recurring pressure in relatively transverse directions, thereby maintaining the particles in a state of pronounced turbulence for a time sufficient to cause the systematic and progressive agglomeration of the particles into substantially spherical granules of the character described.

8. A process of compacting flocculent carbon black, consisting in impacting the particles thereof in a dry state by and between opposing surfaces extending into and surrounding a mass of the particles being treated and relatively movable toward and past each other in a manner maintaining the particles in a state of pronounced turbulence and thus causing systematic and progressive agglomeration of the particles into relatively dense, non-adherent granules capable of withstanding handling in bulk without substantial disintegration, and simultaneously moving the particles and granules in a direction transversely to the relative movement of said surfaces, thereby keeping the granules substantially uniform in size throughout the mass.

9. A process of compacting carbon black, which consists in impacting the particles of flocculent carbon black in a dry state between opposing surfaces thereby maintaining the particles in a state of pronounced turbulence for a time sufficient to cause systematic and progressive agglomeration of the particles into relatively dense, non-adherent granules capable of withstanding handling in bulk without substantial disintegration, separating the resulting product into relatively coarse and fine portions, and using the relatively fine portions as a priming charge in succeeding operations.

10. A process of producing carbon black in the form of granules of pure carbon black of sufficient density and cohesion to withstand handling in bulk without disintegration, which consists in subjecting flocculent carbon black of commerce in a dry state to turbulent agitation, and continuing such agitation until said carbon black assumes the form of relatively tenacious self-sustaining granules.

11. A process of producing carbon black in the form of granules of pure carbon black of sufficient cohesion to withstand handling in bulk without disintegration, which consists in subjecting particles of flocculent carbon black in a dry state to multi-directional impact with other carbon black particles, by turbulent agitation of a dry mass of flocculent carbon black, and continuing such agitation until said carbon black agglomerates into granules which are self-sustaining but disintegrate readily under shearing pressure.

12. A process of producing carbon black in granular condition, which consists in mixing a charge of the flocculent carbon black of commerce with agglomerated granules of carbon black and then subjecting the said granules to multi-directional impact with particles of the flocculent carbon black by turbulent agitation of the mixture, and continuing such agitation until particles of flocculent carbon black agglomerate with the granular carbon black to form a carbon black in the form of granules capable of withstanding handling in bulk without disintegration.

13. The process of manufacturing substantially spherical grain carbon black, which consists in maintaining dry particles of flocculent carbon black in a state approaching perfect turbulence, whereby the particles are freely subjected to symmetrical impact and caused to cohere to other granules and are thus built up progressively into relatively dustless, substantially spherical granules which in bulk have a low viscosity and a density of over 20 pounds per cubic foot.

14. The process of manufacturing spherical grain carbon black which consists in turbulently agitating a dry charge of flocculent carbon black particles at moderate temperature, in such a manner as to subject certain particles symmetrically to free impact pressure of other particles, thus building them up progressively and systematically into substantially spherical granules of an order of approximately 200 mesh in diameter and capable of withstanding handling in bulk without substantial disintegration.

15. The process of imparting dense granular and tenacious characteristics to the light, fluffy carbon black of commerce, which consists in subjecting particles of the latter, in a dry state, to turbulent agitation, thus compacting the particles by impact and causing them to unite by impact-generated cohesion into granules of pure carbon black of sufficient density and cohesion to withstand handling in bulk without disintegration.

16. The process of producing a dense granular carbon black which consists in mixing a charge of flocculent carbon black with carbon black which has been agglomerated into granules and densified, and then turbulently agitating the mixture to cause the systematic and progressive agglomeration of the flocculent carbon black upon said granules into larger, substantially spherical granules, and then applying repeated multi-directional pressure to such granules imparting a smooth surface finish thereto and making them capable of withstanding handling in bulk without substantial disintegration.

17. The process of producing dense, spherical carbon black which consists in mixing a charge of flocculent carbon black with granular carbon black and then turblently agitating the mixture in a dry condition so that the flocculent particles contact with the granules with sufficient velocity to unite therewith to form substantially spherical granules of pure carbon black which in bulk have a low viscosity and a density of over 20 pounds per cubic foot.

18. The process of producing a dense, dustless granular carbon black which consists in mixing a charge of flocculent carbon black with a priming of granular carbon black, and then turbulently agitating the mixture at a temperature below that at which oxidation of the carbon black occurs to cause the flocculent carbon black to agglomerate with the granular carbon black and by subjecting the agglomerates to intermittent multi-directional pressure, to convert them into substantially spherical grain form sufficiently tenacious to withstand substantial normal pressure but being readily disintegrated by shearing pressure.

19. A process of producing substantially dustless, free flowing granules of pure carbon black of sufficient density and cohesion to withstand handling in bulk without disintegration, which consists in mixing a charge of the flocculent carbon black of commerce with small agglomerated granules of carbon black, and then subjecting the mixture to turbulent agitation and continuing such agitation until said mixture has taken the form of relatively tenacious, self-sustaining granules.

20. A process of producing carbon black in the form of a substantially dustless free flowing mass of agglomerates of sufficient density and cohesion to withstand handling in bulk without disintegration, which consists in subjecting particles of flocculent carbon black in a dry state to turbulent agitation by rolling and tumbling and thereby producing said substantially dustless mass of the character described.

21. A process of producing from a mass of flocculent carbon black in the dry, loose state in which it is delivered from the ordinary bolting and sifting apparatus of a carbon black plant, a substantially dustless mass of free flowing coherent agglomerates of carbon black of sufficient density and cohesion to withstand handling in bulk without disintegration, which consists in subjecting such flocculent carbon black to turbulent agitation, and continuing such agitation until such carbon black assumes the form of said relatively tenacious self-sustaining granules.

22. A process of producing from a mass of flocculent carbon black in the dry, loose state in which it is delivered from the ordinary bolting and sifting apparatus of a carbon black plant, a substantially dustless mass of free flowing coherent agglomerates of commercially pure carbon black of sufficient density and cohesion to withstand handling in bulk without disintegration, which consists in adding agglomerated granules of carbon black to a mass of the flocculent carbon black and subjecting the mixture to turbulent agitation by rolling and tumbling.

23. A process of transforming a mass of dry, flocculent carbon black into a substantially dustless mass of free flowing, relatively tenacious, self-sustaining granules of substantial density and cohesion, which consists in adding agglomerated granules of carbon black to a mass of flocculent carbon black and then subjecting the resulting mixture to turbulent agitation to form therein and therefrom granules of carbon black of the character described which are capable of withstanding handling in bulk without substantial disintegration.

24. A process of producing from a mass of flocculent carbon black in the dry, loose state in which it is delivered from the ordinary bolting and sifting apparatus of a carbon black plant, a substantially dustless mass of free flowing coherent agglomerates of carbon black of sufficient density and cohesion to withstand handling in bulk without disintegration, which consists in subjecting such flocculent carbon black to turbulent agitation, and continuing such agitation until substantially all the flocculent carbon black is transformed into relatively tenacious self-sustaining granules having an apparent density of over 20 lbs. per cubic foot.

25. A process of transforming a mass of flocculent carbon black into a substantially dustless, free flowing mass of relatively tenacious, self-sustaining granules, transportable in bulk without disintegration, which consists in subjecting said mass to turbulent agitation and thereby agglomerating substantially all of said mass of flocculent black into relatively compact granules of the character described, substantially free in bulk of unagglomerated particles and having an apparent density of not less than 20 lbs. per cubic foot.

26. The process of transforming flocculent, powdery carbon black into a collection of relatively sturdy, self-sustaining granules, said collection being characterized by being free flowing and substantially free from unagglomerated particles or dust, which consists in subjecting said flocculent carbon black to turbulent agitation whereby the particles of said carbon black are brought into multi-directional bombarding relation with each other, causing impact-generated cohesions between particles of such strength as to cause the particles to build up into tenacious granules, and continuing said turbulent agitation until said granules are sufficiently sturdy to withstand handling in bulk without disintegration.

27. The process of making granular carbon black, said product being characterized by being free flowing and substantially free of unagglomerated particles or dust, substantially as described, which consists in adding agglomerated granules of carbon black to a mass of flocculent powdery carbon black, and subjecting said mixture to turbulent agitation thereby creating multi-directional impacts between particles and granules, whereby the particles are caused by impact-generated cohesions to cohere to the said granules or to each other, and continuing said turbulent agitation until all the dusty particles have been thus caused to cohere into granules sufficiently sturdy to withstand handling in bulk without disintegration.

28. A process of producing carbon black in the form of granules of sufficient density and cohesion to withstand handling in bulk without disintegration, which consists in subjecting flocculent carbon black of commerce in a dry state to turbulent agitation by lifting the carbon black in one area after another and allowing it to fall freely in a closed container and continuing such agitation until the black assumes the form of relatively tenacious self-sustaining granules.

29. A process of producing carbon black in the form of granules of sufficient density and cohesion to withstand handling in bulk without disintegration which consists in subjecting flocculent carbon black of commerce in a dry state to turbulent agitation by passing a series of blades angularly through a mass thereof in a closed container, and continuing such agitation until the carbon black assumes the form of relatively tenacious self-sustaining granules.

EDMUND BILLINGS.
HAROLD H. OFFUTT.

---

CERTIFICATE OF CORRECTION.

Patent No. 2,120,541.          June 14, 1938.

EDMUND BILLINGS, ET AL.

It is hereby certified that error appears in the printed specification of the above numbered patent requiring correction as follows: Page 1, first column, lines 52 and 53, strike out the words "under conditions of turbulent pressure such"; page 2, second column, line 63, for "primary" read priming; page 3, first column, line 66, strike out the word "stationary" and insert the same before the syllable "spi-" in line 67; and that the said Letters Patent should be read with these corrections therein that the same may conform to the record of the case in the Patent Office.

Signed and sealed this 19th day of July, A. D. 1938.

Henry Van Arsdale,
Acting Commissioner of Patents.

(Seal)

withstanding handling in bulk without substantial disintegration.

24. A process of producing from a mass of flocculent carbon black in the dry, loose state in which it is delivered from the ordinary bolting and sifting apparatus of a carbon black plant, a substantially dustless mass of free flowing coherent agglomerates of carbon black of sufficient density and cohesion to withstand handling in bulk without disintegration, which consists in subjecting such flocculent carbon black to turbulent agitation, and continuing such agitation until substantially all the flocculent carbon black is transformed into relatively tenacious self-sustaining granules having an apparent density of over 20 lbs. per cubic foot.

25. A process of transforming a mass of flocculent carbon black into a substantially dustless, free flowing mass of relatively tenacious, self-sustaining granules, transportable in bulk without disintegration, which consists in subjecting said mass to turbulent agitation and thereby agglomerating substantially all of said mass of flocculent black into relatively compact granules of the character described, substantially free in bulk of unagglomerated particles and having an apparent density of not less than 20 lbs. per cubic foot.

26. The process of transforming flocculent, powdery carbon black into a collection of relatively sturdy, self-sustaining granules, said collection being characterized by being free flowing and substantially free from unagglomerated particles or dust, which consists in subjecting said flocculent carbon black to turbulent agitation whereby the particles of said carbon black are brought into multi-directional bombarding relation with each other, causing impact-generated cohesions between particles of such strength as to cause the particles to build up into tenacious granules, and continuing said turbulent agitation until said granules are sufficiently sturdy to withstand handling in bulk without disintegration.

27. The process of making granular carbon black, said product being characterized by being free flowing and substantially free of unagglomerated particles or dust, substantially as described, which consists in adding agglomerated granules of carbon black to a mass of flocculent powdery carbon black, and subjecting said mixture to turbulent agitation thereby creating multi-directional impacts between particles and granules, whereby the particles are caused by impact-generated cohesions to cohere to the said granules or to each other, and continuing said turbulent agitation until all the dusty particles have been thus caused to cohere into granules sufficiently sturdy to withstand handling in bulk without disintegration.

28. A process of producing carbon black in the form of granules of sufficient density and cohesion to withstand handling in bulk without disintegration, which consists in subjecting flocculent carbon black of commerce in a dry state to turbulent agitation by lifting the carbon black in one area after another and allowing it to fall freely in a closed container and continuing such agitation until the black assumes the form of relatively tenacious self-sustaining granules.

29. A process of producing carbon black in the form of granules of sufficient density and cohesion to withstand handling in bulk without disintegration which consists in subjecting flocculent carbon black of commerce in a dry state to turbulent agitation by passing a series of blades angularly through a mass thereof in a closed container, and continuing such agitation until the carbon black assumes the form of relatively tenacious self-sustaining granules.

EDMUND BILLINGS.
HAROLD H. OFFUTT.

---

CERTIFICATE OF CORRECTION.

Patent No. 2,120,541.  June 14, 1938.

EDMUND BILLINGS, ET AL.

It is hereby certified that error appears in the printed specification of the above numbered patent requiring correction as follows: Page 1, first column, lines 52 and 53, strike out the words "under conditions of turbulent pressure such"; page 2, second column, line 63, for "primary" read priming; page 3, first column, line 66, strike out the word "stationary" and insert the same before the syllable "spi-" in line 67; and that the said Letters Patent should be read with these corrections therein that the same may conform to the record of the case in the Patent Office.

Signed and sealed this 19th day of July, A. D. 1938.

Henry Van Arsdale,
Acting Commissioner of Patents.

(Seal)

CERTIFICATE OF CORRECTION.

Patent No. 2,120,541.  June 14, 1938.

EDMUND BILLINGS, ET AL.

It is hereby certified that error appears in the printed specification of the above numbered patent requiring correction as follows: Page 1, first column, lines 52 and 53, strike out the words "under conditions of turbulent pressure such"; page 2, second column, line 63, for "primary" read priming; page 3, first column, line 66, strike out the word "stationary" and insert the same before the syllable "spi-" in line 67; and that the said Letters Patent should be read with these corrections therein that the same may conform to the record of the case in the Patent Office.

Signed and sealed this 19th day of July, A. D. 1938.

(Seal)

Henry Van Arsdale,
Acting Commissioner of Patents.